Patented July 3, 1928.

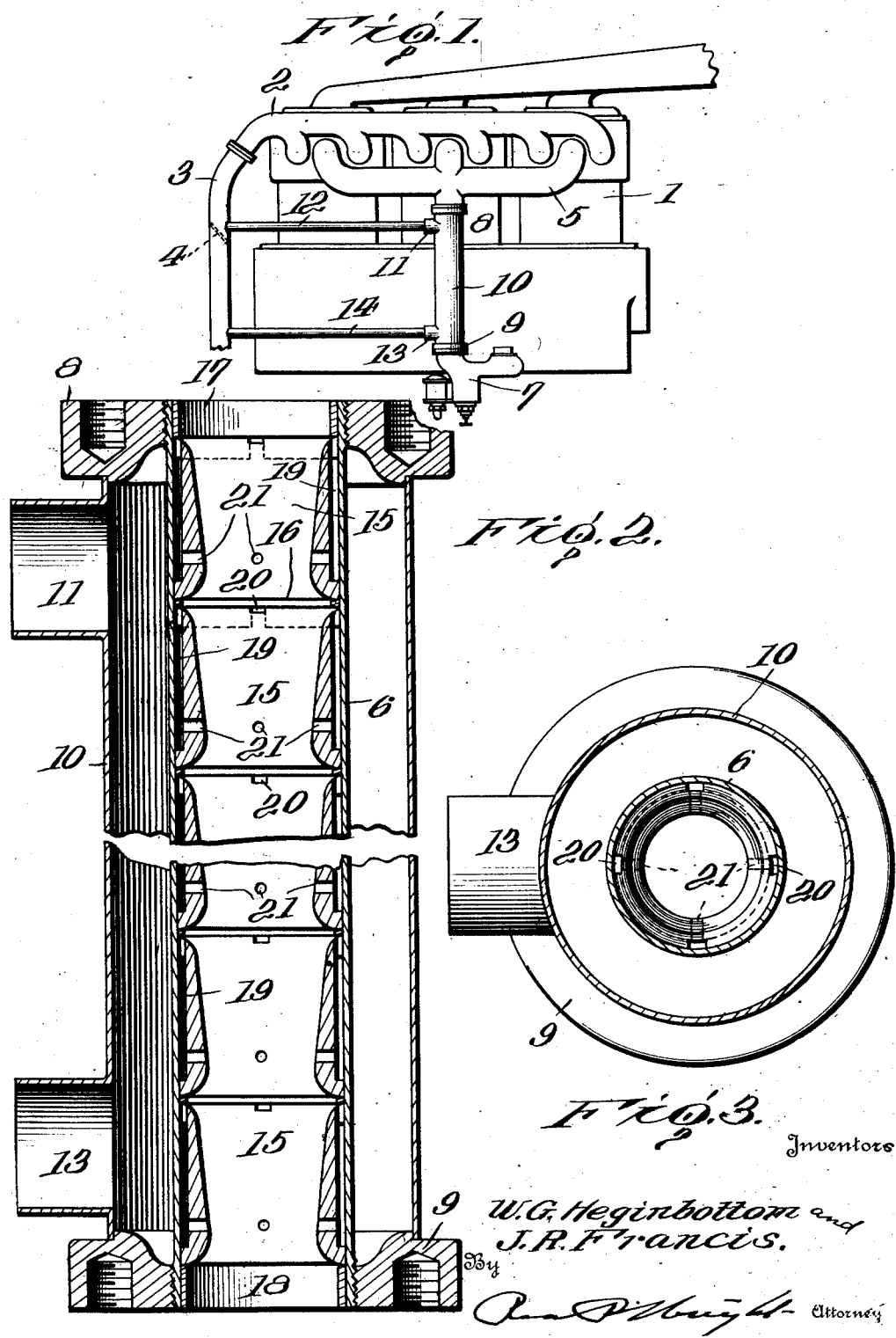

1,675,349

UNITED STATES PATENT OFFICE.

WALTER G. HEGINBOTTOM AND JACOB RICHARD FRANCIS, OF FLINT, MICHIGAN.

INTAKE MANIFOLD FOR INTERNAL-COMBUSTION ENGINES.

Application filed November 25, 1921. Serial No. 517,555.

This invention relates to certain new and useful improvements in intake manifolds for internal combustion engines, the object being to provide a manifold with a series of restrictions to cause the flow velocity of the explosive mixture in its passage to the engine to be alternately increased and decreased whereby the heavier particles of fuel will be thrown outwardly at the point of least restriction or low velocity and collected and vaporized and returned to the induction pipe at the point of greatest restriction or high velocity so as to cause a very efficient explosive mixture to be produced.

A further object of the invention is to provide a manifold or induction pipe having a series of restrictions formed of Venturi tubes arranged in tandem and formed of low heat conducting material so as to prevent the explosive charge from being overheated.

Another object of the invention is to provide an induction pipe with a series of Venturi tubes having annular chambers into which the heavier particles are adapted to be drawn from the point of least restriction and delivered back into the induction pipe at the point of greatest restriction, means being provided for heating the annular chamber so as to cause the heavier particles of fuel which are drawn into the chambers to be vaporized and delivered into the induction pipe.

Another and still further object of the invention is to provide novel means for only heating the heavier particles of fuel in its passage through the induction pipe by employing Venturi tubes formed of low heat conducting material, such as glass, carbon, porcelain or asbestos composition, whereby the annular chambers will be heated from a heat jacket so as to apply heat to the heavier particles of fuel drawn into the annular chambers without applying heat to the main volume of explosive fluid passing through the manifold.

Another object of the invention is to provide a construction of manifold which can be manufactured very cheaply, the series of Venturi tubes being arranged within the induction pipe in such a manner that they can be readily inserted or removed.

Other and further objects and advantages of the invention will be hereinafter set forth and the novel features thereof defined by the appended claims.

In the drawings,

Figure 1 is a side elevation of an internal combustion engine showing the application of our improved construction of manifold thereto;

Figure 2 is an enlarged vertical section through the feed portion of a manifold showing a series of Venturi tubes disposed therein to form a series of restrictions; and Figure 3 is a horizontal section through the same.

In the drawing 1 indicates an internal combustion engine, 2 the exhaust manifold from which extends an exhaust pipe 3 having a valve 4 for controlling the passage of exhaust gases therethrough.

In the embodiment of our invention as herein shown, we have shown a manifold formed of two sections, comprising an upper or distributing section 5 and a feed section 6 connected to a charge forming device 7 of any of the well known types now in use. The feed section 6 comprises a pipe having a casting 8 at its upper end for connecting the same to the upper section 5 of the manifold and a casting 9 at its lower end connecting the same to the outlet of a charge forming device. The induction pipe 6 forming the lower section of the manifold is surrounded by a heat jacket 10 having an inlet 11 connected by a pipe 12 to the exhaust pipe 3 to the engine side of the valve 4 and an outlet 13 connected to the exhaust pipe 3 by a pipe 14 to the muffler side of the valve 4 whereby we are able to control the passage of the exhaust gases through the heat chamber formed by the jacket 10.

As shown in the drawing the induction pipe is provided with threaded ends to receive the castings 8 and 9 which are provided with shoulders to receive the ends of the jacket 10 whereby a complete unit is formed which can be installed on any of the well known types of internal combustion engines now in use and while we have shown the lower section of the manifold arranged in a vertical position, it is, of course, understood that this member can be disposed in a horizontal position and used so as to obtain the same result.

In order to increase and decrease the flow velocity of the main charge of fuel delivered from the charge forming device into the lower end of the section 6 of the manifold, we provide this section with a series of Venturi tubes 15 arranged in tandem and separated by gaskets 16. These Venturi tubes are formed of a low heat conducting material, such as glass, porcelain, carbon or asbestos composition and as herein shown are secured in superposed position by rings 17 and 18.

The outer walls of the Venturi tubes are annularly recessed to form chambers 19, the inner wall of which is formed by the induction pipe 6 which forms the inner wall also of the heat jacket 7 to enable the application of heat to the section 6 so that the annular chambers 9 will be heated to a high degree of temperature and as the Venturi tubes are formed of low heat conducting material so as to insulate the heat from the main charge, we are able to raise the temperature in these chambers to a high degree so as to cause the heavier particles of fuel which are drawn into the same to be thoroughly vaporized when delivered to the flow of explosive mixture therethrough.

The chambers 19 are provided with inlets 20 at the upper end or at the point of least restriction and outlets 21 at approximately the point of greatest restriction and as the flow velocity of the explosive charge in its passage through the induction pipe is alternately increased and decreased, the heavier particles are thrown outwardly upon reduced velocity flow and drawn into the inlets 20 and by the circulation and gravity when the device is arranged in vertical position flow through the heated chambers 19 and are vaporized and due to the high velocity at the outlets 21, the vaporized fuel within the chambers is drawn into the induction pipe and mixes with the explosive charge passing therethrough.

In the drawing we have shown each of the chambers 19 with four inlets and four outlets, but it is, of course, understood that we do not wish to limit ourselves to the use of any number of inlets and outlets as our invention consists broadly in providing an induction pipe with a series of Venturi tubes arranged in tandem so that the flow velocity is alternately or successively increased and decreased, each Venturi tube being provided with a chamber into which the heavier particles of fuel, which adhere to the wall of the Venturi tube or are thrown outwardly, are drawn into a heated chamber where they are subjected to intense heat to cause a thorough vaporization of these particles, which are returned to the mixture in its passage through the induction pipe at the point of greatest velocity whereby we are able to form a very high and efficient explosive mixture so as to overcome the disadvantages now existing.

While we have shown a manifold constructed in a particular manner by arranging superposed Venturi tubes in the feed end thereof, we do not wish to limit ourselves to the manner of constructing the manifold as herein shown as we are aware that various changes can be made without departing from our invention which consists broadly in constructing a manifold with a series of restrictions in order to successively increase and decrease the flow velocity of the explosive charge in its passage therethrough in connection with means for collecting the heavier or unvaporized particles of the explosive charge and vaporizing these particles and then returning the same to the volume of explosive charge in its passage therethrough.

We do not wish to limit ourselves to the use of any particular construction of heating means as we are aware that various changes can be made in the construction shown as our invention consists in this respect to heating the chamber formed in each Venturi tube in such a manner that the main volume of explosive fluid in its passage through the induction pipe will not be subjected to heat, although we are aware that good results could be obtained by constructing an induction pipe with a series of restrictions formed of a material which is not a low heat conducting material, as by such construction the whole volume of explosive fluid will be heated and when using certain low grade fuels, it may be advantageous to construct the Venturi tube of metal so that the volume would be heated. In either event, the greatest amount of heat would be applied to the heavier particles which are drawn into the chambers so that these particles would be collected and thoroughly vaporized before being delivered back into the volume in its passage to the internal combustion engine.

From the foregoing description it will be seen that we have provided a manifold for internal combustion engines having a series of restrictions and a series of chambers, each chamber being provided with an inlet opening and an outlet opening in connection with means for heating these chambers so as to cause the heavier particles which are drawn into the chambers to be thoroughly vaporized and delivered into the induction pipe and mixed with the charge in its passage therethrough.

What we claim is:—

1. An intake for internal combustion engines having a series of restrictions, each being provided with an exterior chamber, said chamber having an inlet at one end and an outlet at its other end and means for heating said chamber.

2. An intake manifold for internal combustion engines having a straight passageway provided with a series of restrictions for successively increasing and decreasing the flow velocity of the explosive charge in its passage therethrough and means for collecting the heavier particles at the point of decreased flow velocity and vaporizing said particles and returning them to the volume at the point of greatest flow velocity.

3. A manifold for internal combustion engines having a series of Venturi tubes disposed therein to form a series of restrictions, each Venturi tube being provided with an exterior chamber having an inlet at the point of less restriction and an outlet at the point of greatest restriction.

4. A manifold for an internal combustion engine having a series of Venturi tubes arranged in tandem formed of low insulating material, each Venturi tube having a chamber provided with an inlet at a point of least restriction and an outlet at the point of greatest restriction and means for heating the chambers of said Venturi tubes.

5. A manifold for an internal combustion engine having a series of Venturi tubes arranged in tandem, each Venturi tube being provided with means for collecting the heavier particles of the explosive mixture in its passage therethrough, vaporizing said particles and returning the vaporized gas to the mixture in its passage therethrough at the point of greatest restriction.

6. An intake pipe for an internal combustion engine comprising a pipe having a series of Venturi tubes arranged in tandem, each Venturi tube being provided with an annular chamber having inlets and outlets, said Venturi tubes being formed of low heat conducting material and means for heating the chambers of said Venturi tubes.

7. An intake pipe for an internal combustion engine having Venturi tubes arranged in tandem therein, each Venturi tube having an annular recess forming in conjunction with said pipe annular chambers, each chamber being provided with an inlet and an outlet and a heat jacket surrounding said pipe for heating the particles of fuel within the chambers of said Venturi tube.

8. An intake pipe for internal combustion engines having a series of Venturi tubes disposed therein, each being provided with an annular chamber having inlets at the point of less restriction and outlets at the point of greatest restriction, means for heating said chambers to cause the particles of fuel passing through said pipe to be drawn into said chambers and vaporized and delivered into the mixture in its passage therethrough.

9. An intake pipe having means for successively increasing and decreasing the flow velocity of the explosive charge in its passage therethrough and means for collecting the heavier particles of the explosive charge at the point of decreased flow velocity and vaporizing said particles and delivering the same into the mixture at the point of greatest flow velocity.

10. An intake pipe for internal combustion engines comprising a pipe section having a casting carried by each end, said pipe being surrounded by a heat jacket having means for connecting the same to the exhaust of the internal combustion engine. a series of Venturi tubes formed of low heat insulating material arranged within said pipe in tandem, each Venturi tube having an annular recess forming an annular chamber, the outer wall of which is subjected to the heat from the exhaust gases, each of said chambers being provided with an inlet and outlet, the inlet being disposed at the point of less restriction and the outlet at the point of greatest restriction.

In testimony whereof we hereunto affix our signatures.

WALTER G. HEGINBOTTOM.
JACOB RICHARD FRANCIS.